United States Patent [19]

Clark, Jr.

[11] 4,059,785
[45] Nov. 22, 1977

[54] CRT DISPLAY WITH TRUNCATED RHO-THETA PRESENTATION

[75] Inventor: Charles Albert Clark, Jr., Chatsworth, Calif.

[73] Assignee: RCA Corporation, New York, N.Y.

[21] Appl. No.: 687,747

[22] Filed: May 19, 1976

[51] Int. Cl.² .......................................... H01J 29/78
[52] U.S. Cl. .................................. 315/378; 315/387; 343/5 W
[58] Field of Search ...................... 315/378, 386, 387; 343/5 W

[56] References Cited

U.S. PATENT DOCUMENTS 3,885,237  5/1975  Kirkpatrick ...................... 343/5 W
3,975,662  8/1976  Janosky ............................ 315/378

Primary Examiner—Maynard R. Wilbur
Assistant Examiner—T. M. Blum
Attorney, Agent, or Firm—H. Christoffersen; Joseph D. Lazar; Raymond E. Smiley

[57] ABSTRACT

In a CRT display exhibiting a Rho-Theta format where certain of the lines would normally extend beyond the edges of the CRT screen, feedback signals from at least a deflection coil are used to terminate display lines at the edge of the screen and to initiate immediate retrace. Compensation is applied to at least a deflection voltage to compensate for display line bunching caused by unequal scan line times.

9 Claims, 5 Drawing Figures

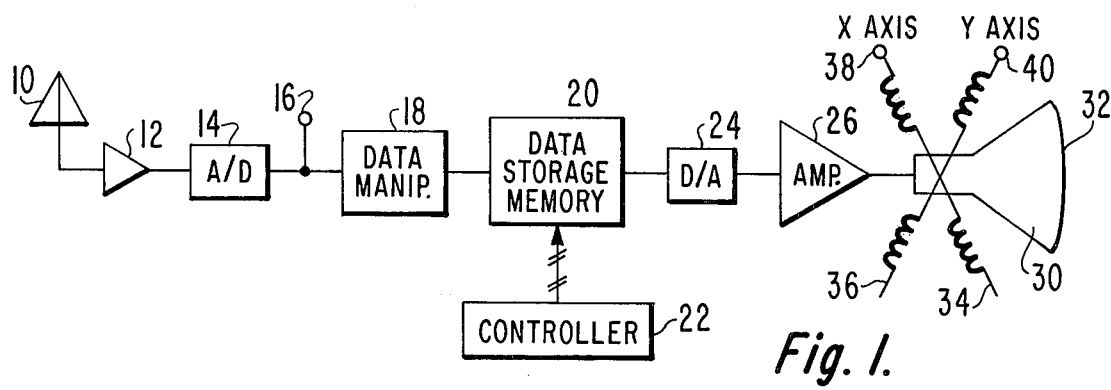
Fig. 1.
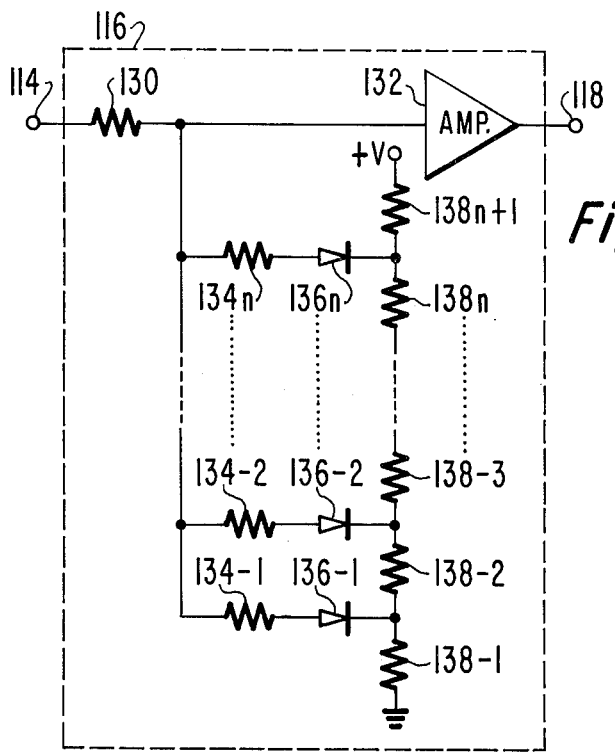
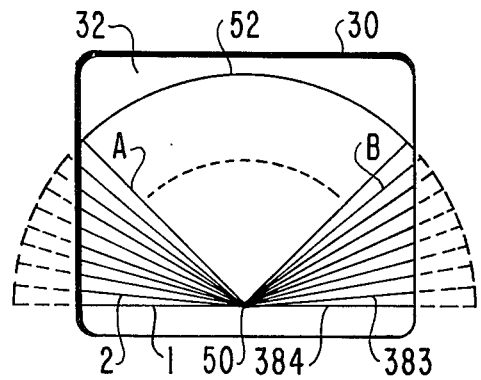
Fig. 2.
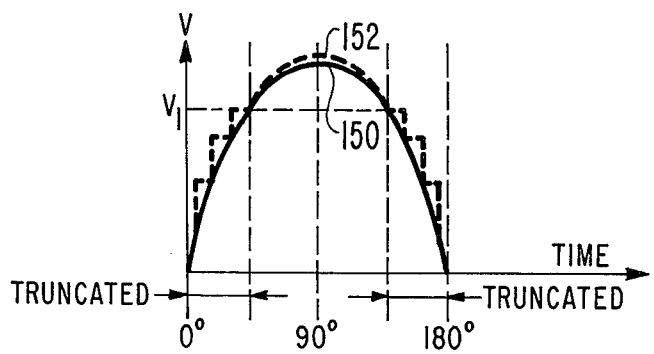

CRT DISPLAY WITH TRUNCATED RHO-THETA PRESENTATION

BACKGROUND OF THE INVENTION

On a rectangular faced cathode ray tube (CRT) it is sometimes desirable to exhibit a semi-circular presentation. An example of such a presentation is in airborne weather radar display. In such a situation depending on the size and aspect ratio of the CRT display surface, certain portions of the graphics information may extend beyond the side or top edges of the display surface. Such a situation might present no practical problem if a desired refresh rate could be sustained with reasonably priced hardware at a reasonable power level. Where, however, these conditons cannot be met as is often the case in commercially economic equipment it becomes necessary to truncate the scan lines which would otherwise extend beyond the edge of the screen at the edge. For those lines which are truncated, succeeding lines are angularly spaced (relative to nontruncated lines) too closely to one another as a result of lessened scan times.

SUMMARY OF THE INVENTION

In accordance with the invention, in a CRT display in which at least some scan lines would otherwise extend beyond an edge of the display screen, means are provided responsive to the detection of an electronic beam reaching an edge of the display screen for producing a signal. A means responsive to that signal initiates retrace of the electronic beam to an origin. In accordance with another aspect of the invention in a system employing a CRT with orthogonal deflection means, means are provided for producing deflecting signals angularly spaced uniformly with respect to time. Means responsive to a certain number of values less than all values of at least one deflection signal are provided to the deflection coil for altering the one deflection signal as a function of its values.

BRIEF DESCRIPTION OF THE DRAWING

FIG. 1 is a basic digital weather radar receiving section essentially in block diagram form of the type which employs the present invention;

FIG. 2 is an illustration of the face plate of a CRT of the type employed in FIG. 1;

FIG. 4a is a correction circuit in electrical schematic form useful in the apparatus of FIG. 3 in accordance with the invention; and FIG. 4b is a set of superimposed waveforms useful in understanding the circuit of FIG. 4a.

DETAILED DESCRIPTION OF A PREFERRED EMBODIMENT

Figure 3:
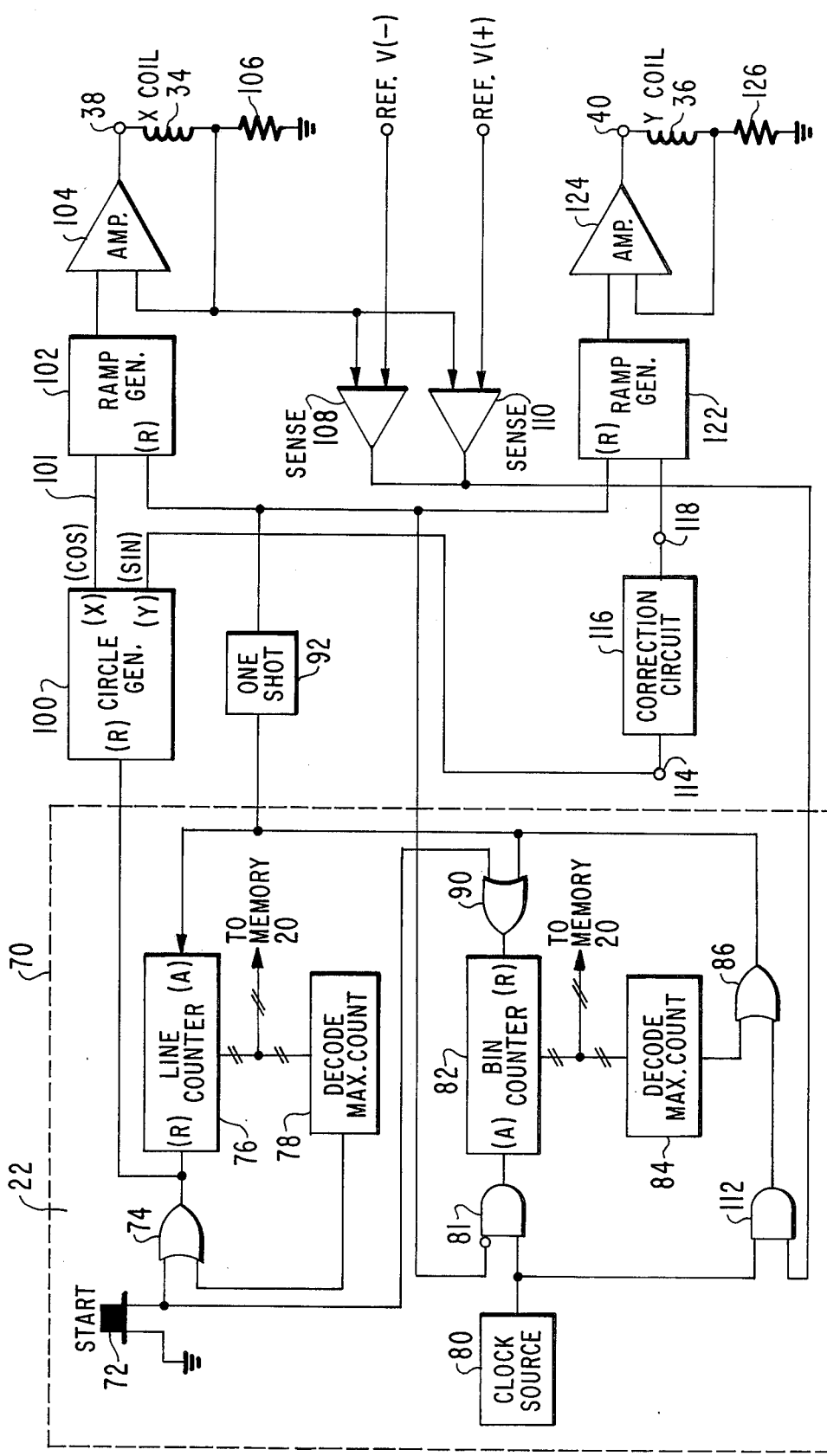
FIG. 3 is a portion in greater detail, of the radar of FIG. 1 illustrating a preferred embodiment of the invention largely in a block diagram form.

Referring to FIG. 1, legend 10 represents an antenna in an airborne weather radar which is incrementally positionable through a 180° arc (by apparatus not shown but of conventional design). Antenna 10 is coupled to detector/amplifier 12 for amplifying signals received by antenna 10. Amplifier 12 of conventional design, is coupled to an analog-to-digital (A/D) converter 14 of conventional design which is adapted to produce at its output terminal 16 a plurality of successive time spaced digital signals for each azimuth (angularly position of antenna 10). In one commercial weather radar A/D 14 produces 128 two bit digital signals from a like number of succeeding distances in space at each of 384 angular positions. Terminal 16 is coupled to a data manipulation (DM) device 18. DM 18 may manipulate, alter and organize the digital data for storage in a data storage memory 20 to which the output terminal DM 18 is coupled. DM 18 will not be described in detail as it forms no part of the invention. However, one such data manipulation device is described in detail in U.S. patent application, Ser. No. 583,186 filed June 2, 1975, by Robert Holt et al. and assigned to the assignee of the instant application. Memory 20 is capable of storing bits for all azimuth positions. In the extreme for the exemplary radar mentioned previously, memory 20 has storage for 128·2·384=98,304 bits. As will be described in detail shortly, not all 128 positions of each azimuth are displayed so that a somewhat smaller capacity memory 20 may be provided. Storage of data into and removal of data from memory 20 is under the control of a controller 22 coupled to memory 20 by a multiconductor cable (illustrated as line with crosshatching). Controller 22 will be described in greater detail in connection with FIG. 3. Under the control of controller 22, stored data is passed to a digital-to-analog (D/A) converter 24 bit serial and converted to analog signals. D/A 24 is coupled to an amplifier 26 where the analog signals are amplified as required. Amplifier 26 is coupled to the video drive signal terminal of a CRT 30 to be therein converted to a visual image appearing on the face plate 32 of CRT 30. CRT 30 is of conventional type including X (horizontal) and Y (vertical) deflection coils 34 and 36 respectively. Deflection signals are supplied to coil terminals 38 and 40 by circuitry illustrated in FIG. 3 which will be described in detail later.

FIG. 2 to which attention is now directed illustrates the face plate 32 of CRT 30 (FIG. 1). The display face is of conventional rectangular shape. The display is in the form of succeeding scan lines numbered 1, 2 . . . 384 respectively (only four of these lines being numbered by way of example). The lines extend from an origin 50, a given radial distance, the limit of which is illustrated by semicircular limit line 52. It will be noted that limit line 52 extends beyond the left and right edges of CRT face plate 32 and is illustrated dashed outside the edges of the tube face plate.

It will, at first impression, seem that even though not all data appears on the screen at the left and right (low numbered and high numbered azimuth lines) portions of the screen it would be simplest to merely deflect the electrical beam to the same radial position for each azimuth regardless of whether or not the totality of a given azimuth line is viewable. That is, there would seem to be no savings by truncating azimuth lines at the face plate boundaries. In practice, the first assumption is true; the second is not. To present a flicker free image a frame rate of at least 60 Hz is necessary. Given the maximum rate at which data can be removed from memory 20, the number of lines to be presented on CRT 30 and the required frame refresh rate, the time remaining for a retrace of the scan beam back to the origin as the scan of a line is completed is less than existing systems can tolerate. However by not deflecting beyond the edge of the screen considerably more time remains for retrace. In one commercial system time available for retrace with truncation is opposed to no truncation increased by about 35%. Said another way, time for retrace went from an unattainable value to an easily attainable value.

In addition to allowing an increased retrace time, truncation also saves power, a much desired feature in airborne equipment. Deflection drive power must be supplied to the deflection drive transistors. Therefore it follows that the less deflection the less power required. Also with less power supplied to the deflection coils less heat is generated in dissipating that power as a result of retrace of the deflection beam to the origin.

Truncation is accomplished by the circuit of FIG. 3 to which attention is now directed. Controller 22 (FIG. 1) generally includes the components within dashed line 70. A start switch 72 is coupled to one input terminal of OR gate 74. Although illustrated schematically as a push button, switch 72 may in a practical radar be merely part of the system initialization triggered by the power on-off switch. The output terminal of OR gate 74 is coupled to the reset (R) terminal of line counter 76. Counter 76 is a standard counter capable of counting to the number of azimuth lines to be supplied on CRT face plate 32 (FIG. 2). In the case of the radar device whose parameters have been given, this number is 384. The output terminal of line counter 76 is coupled via a multi-conductor cable to memory 20 (FIG. 1) and to the input terminal of a decode maximum counter (DMC) logic 78. DMC is adapted to produce a momentary pulse when counter 76 reaches a count of 384. The output terminal of DMC logic 78 is coupled to the second input terminal of OR gate 74.

A lock source 80 is coupled to one input terminal of an AND gate 81. Clock source 80 produces momentary pulses at the maximum rate data can be read from memory 20 (FIG. 1). The output terminal of AND gate 81 is coupled to the advance (A) terminal of a bin counter 82. Counter 82 is similar to counter 76 but need only count to the number of digits in one azimuth line of information, 128 by way of example. The output terminal of counter 82 is coupled via a multiconductor cable to memory 20 (FIG. 1) and to a DMC 84. DMC 84 is similar to device 78 except that it produces a momentary pulse when counter 82 produces a count of 128 in the example radar. The output terminal of DMC 84 is coupled to one input terminal of OR gate 86. The output terminal of OR gate 86 is coupled respectively to one input terminal of OR gate 90, to the A terminal of counter 76 and to the input terminal of a one shot 92. The output terminal of switch 72 is coupled to a second input terminal of OR gate 90. The output terminal of OR gate 90 is coupled to the R terminal of counter 82.

The output terminal of OR gate 74 is coupled to the R terminal of a circle generator 100. Circle generator 100 produces cosine and sine wave forms respectively at its X and Y output terminals. (The designations X and Y relate to the X (horizontal) and Y (vertical) axis of CRT 30 (FIG. 1).

The X output terminal of circle generator via line 10 is coupled to a ramp generator 102. Ramp generator 102 may comprise merely a series coupled resistor and capacitor with a controllable shorting switch (transistor) across the capacitor terminals as is well known in the art. The output terminal of ramp generator 102 is coupled to one input terminal of a power deflection amplifier 104. The output terminal of amplifier 104 is coupled to terminal 38 of X deflection coil 34 associated with CRT 30 (FIG. 1). Coil 34 is coupled to a current sensing resistor 106 which is referenced to some convenient reference point such as ground. The junction of coil 34 and resistor 106 is coupled as feedback to a second input terminal of amplifier 104 and to one input terminal each of sense amplifiers 108 and 110 respectively.

A positive reference voltage is coupled to the second input terminal of sense amplifier 108 and a negative reference voltage is coupled to second input terminal of sense amplifier 110. The reference voltages in an absolute sense are chosen to be equal to the feedback voltage from coil 34 when deflected to or just beyond the left and right edges of face plate 32. Therefore sense amplifier 108 produces an appropriate output voltage when deflection beyond the left side of face plate 32 occurs while sense amplifier 110 produces the same signal when deflection beyond the right side of the face plate occurs.

The output terminals of amplifiers 108 and 110 are coupled to an input terminal of an AND gate 112. Clock source 80 is coupled to the second input terminal of AND gate 112. The output terminal of AND gate 112 is coupled to the second input terminal of OR gate 86. The operation of gate 112 is such that it produces an output signal at the first clock pulse after deflection beyond the edge of face plate 32 occurs in either a positive or negative sense.

The Y output terminal of circle generator 100 is coupled to input terminal 114 of a correction circuit 116 illustrated in greater detail in FIG. 4a. The output terminal 118 of correction circuit 116 is coupled to the input terminal of a ramp generator 122 which is similar to ramp generator 102. The output terminal of ramp generator 122 is coupled to a deflection amplifier 124 which is similar to amplifier 104. The output terminal of amplifier 124 is coupled to terminal 40 of Y deflection coil 36. Coil 36 is coupled to a current sensing resistor 126 which is similar to resistor 106. The junction of coil 36 and resistor 126 is coupled to the second input terminal of deflection amplifier 124 as feedback. The output terminal of one shot 92 is coupled to the R terminal of ramp generators 102 and 122 and to an inverting terminal of AND gate 81.

Reference is now made to FIG. 4a where correction circuit 116 is illustrated in detail. Terminal 114 is coupled to a divider resistor 130, the other terminal of resistor 130 is coupled to the input terminal of a low gain, high impedance amplifier 132 and to one terminal each of resistors 134-1 . . . 134-n, only three resistors being shown by way of example. The resistors are respectively coupled to the anode terminals of diodes 136-1 . . . 136-n, only three being illustrated. The cathode terminals of each of the diodes are coupled to respective junctions of a series resistor network of resistors legended 138-1 . . . 138-n+1, five resistors being illustrated by way of example. The series resistor network is coupled between some reference positive voltage and ground.

Operation of the circuit of FIG. 4a will be described with reference to FIG. 4b to which attention is now directed. The solid waveform 150 is that appearing at input terminal 114 of correction circuit 116. The dotted waveform 152 is that appearing at terminal 118. In reality the portion of the input and output waveforms 150 and 152 which is not described as truncated (that is approximately the middle third of the 180° coverage of screen 32) coincide but are shown separately for illustration purposes. In the truncated regions the output voltage is in excess of the input voltage at any given degree point.

Operation of the circuit of FIG. 4a is as follows. With no or very low voltage applied to terminal 114 (FIG. 4a) such as corresponding to 0° the output of amplifier 132 (i.e. terminal 118) is essentially 0 volts. At this voltage all diodes 136-X (the X represents the numeral following the hyphen in FIG. 4a) are biased so that the voltage at terminal 118 is merely the voltage at terminal 114 times the amplifier gain, G, which in one example is about 1.2. As the voltage at terminal 114 continues to rise diode 136-1 becomes forward biased creating a divider from resistors 130, 134-1 and 138-1. This causes the voltage at terminal 118 to be proportionally less than it would be in the absence of the diode ladder network. As the voltage continues to rise other diodes 136-X in succession are forward biased passing proportionally larger amounts of current to the ladder network and therefore proportionally lower voltage to amplifier 132 due to the voltage drop across resistor 130. By the time the voltage in terminal 114 has reached $V_1$, FIG. 4a, all diodes 136-X are forward biased and voltage at the input terminal of amplifier 132 is the voltage at terminal 114 divided by G. This relationship is due to the values chosen for the various ones of resistors 130, 134-X and 138-X. Thus at input voltage above $V_1$ (i.e., at voltages corresponding to no truncation) the voltage at terminal 118 equals the voltage at terminal 114. As the voltage at terminal 114 decreases (latter part of the waveforms FIG. 4b) the diodes become back biased one by one beginning with 136-n and ending with 136-1.

Operation of the circuit of FIG. 3 will be described with the assumed initial condition that memory 20 (FIG. 1) contains one frame of information to be displayed in the form of azimuth scanning lines on face plate 32. In reality the screen continuously contains an image but the operation will be described assuming the screen is initially blank.

When start switch 72 is depressed, counters 76 and 82 are reset to zero and circle generator 100 is reset to a condition to which X (cosine) output is producing maximum positive voltage (i.e. the positive peak of the cosine wave) and in which the Y output (sine) is producing zero voltage. Both ramp generators 102 and 122 are assumed reset to zero.

Then ramp generator 102 having maximum voltage applied to it by circle generator 100 produces a substantially linear time incrementing amplifier signal via amplifier 104 to X deflection coil 34. This increasing signal causes a beam scan from origin 50 (FIG. 2) along scan line 1. Since the Y output of circle generator 100 is zero, no Y deflection current is present in coil 36 so there is no Y component to scan line 1. As beam deflection is occuring, clock source 80 is advancing bin counter 82 which causes memory 20 (FIG. 1) to read out digital data for the first scan line, a digit at a time. The digital data is converted to analog data by D/A 24 and converted to video drive signals by amplifier 26.

Eventually sufficient current will be present in coil 34 to deflect the CRT 30 electron beam to the left edge of viewing screen 32 (as illustrated in FIG. 2). This will occur in time before the scan line 1 reaches the radial distance indicated by line 52 and therefore before bin encounter 82 reaches its maximum count.

When the beam reaches the screen edge, sense amplifier 108 will be activated producing a pulse to prime AND gate 112. The next clock pulse from source 80 enables the and gate producing a pulse to: 1. reset bin counter 82, 2. advance line counter 76 by one and 3. trigger one shot 92. Triggered one shot 92 produces a pulse of fixed sufficient duration to reset ramp generators 102 and 122. Also during the time the pulse from one shot 92 is present, beam blanking of CRT 30 occurs by circuitry not shown but which is well known to those skilled in the art. Also while the pulse from one shot 92 is present, gate 81 is disabled so bin counter 82 remains reset. The false from one shot 92 is of such duration that when it terminates, power has been dissipated in the X and Y deflection coils 34, 36 respectively so the scan beam is back to the origin 50 (FIG. 2).

Since the scan beam is terminated or truncated before its full scan and since the scan rate is fixed, determined only by the frequency of clock source 80 and the ramp generators 102, 122; (a rate which is of course set to be compatible with the source 80 frequency), less scan time is required to complete scan line 1 than for a full scan. Further less power consumption and dissipation occur in coils 34, 36 bringing about the improvements mentioned earlier (i.e. more time for retrace and less power consumption and dissipation). When the pulse from one shot 92 ceases AND gate 81 is again enabled, bin counter 82 begins to advance causing data to be read from memory 20 for the second scan line (legend 2, FIG. 2) and ramp generators 102 and 122 begin to produce ramp voltages to drive the X and Y deflection coils. Assuming for the moment that correction circuit 116 is bypassed, line 2 (FIG. 2) will be spaced closer to line 1 than is desired. This follows since because line 1 was terminated before it reached its full radial distance the Y output of circle generator 100 is at a lesser magnitude than it would be if a full length scan had occured. As described in connection with the operation of FIG. 4a circuit 116 provides a boost voltage to the Y signal and therefore to the Y coil 36 so that line 2 is properly spaced from line 1. Assuming 384 lines as in the exemplary apparatus and 180° presentation the desired line to line spacing is 180°/384 lines = approximately 0.47°. When the X deflection again reaches the left edge of the face plate 32, sense amplifier 110 produces a pulse as previously described in connection with line 1 and the radar resets preparatory to writing the next line. This procedure continues until the line is sanned which terminates at or just before (to the right of) the left side of viewing screen (line A, FIG. 2).

Bin counter 82 will therefore be at its maximum count (128) causing DMC 84 to produce a pulse which performs the same task as the pulse produced by sense amplifier 108. Also when line A is scanned the Y output voltage from circle generator 100 has reached value $V_1$ (FIG. 4b) which means all diodes 136-X (FIG. 4a) are forward biased and correction circuit 116 is producing unity gain. Succeeding scan lines are created on CRT face plate 32 until scan line B occurs (FIG. 2). This is the first scan line terminating just beyond (right of) the right side of face plate 32. Therefore when the X deflection current is sufficient to cause a scan beyond the right side of the screen sense amplifier 108 energized. The resulting output pulse causes the same three events as caused by the pulses from sense amplifier 110. Also since at this point the Y output voltage from circle generator 100 has dropped below $V_1$, correction circuit 116 begins to function as previously described.

Ultimately in the manner described all 384 lines will be scanned on face plate 32, line counter 76 will advance to a maximum count 384 triggering DMC 78. The resulting pulse from DMC 78 resets line counter 76 and circle generator 100. Ramp generator 102 and bin counter 82 were reset by the pulse which advanced line counter 76 to its maximum count so the radar apparatus is ready to again refresh viewing screen 32 as previously described.

It should be realized by those skilled in the art that the foregoing description is only one exemplary apparatus in which the invention may be produced. Truncation may occur only in the X axis, only in the Y axis, or in both as the situation dictates. For example Y axis truncation involves merely the addition of sense amplifiers like 108 and 110 and perhaps additional correction circuitry in the line 101 connecting the X output of circle generator 100 to ramp generator 102. If only left X axis truncation is desired, for example, sense amplifier 108 would be removed and suitable alteration to correction circuitry 116 would be made.

The exact position of the scan beam when retrace begins is a matter of design choice. Thus the claims are intended to comprise a range of beam truncations from just inside the screen edge to just beyond. Further the method of detection of beam position is not intended to be limited to that described but could encompass, for example, detection means for count detection.

What is claimed is:

1. In a cathode ray tube display device which has a viewing screen and which includes a deflectable electron beam and which includes a deflection means for causing said beam to scan from a common origin on said screen across said viewing screen to and beyond the edge of said viewing screen in a succession of scan lines, the improvement comprising:
   first means responsive to an indication that said electron beam has been scanned to said edge of said viewing screen for producing a signal; and
   second means responsive to said signal for initiating retrace of said electron beam to said common origin, and a fixed time after initiating said retrace for initiating the deflection by said deflection means of the next scan line of said succession thereof.

2. The combination as set forth in claim 1 wherein said deflection means includes a deflection coil and wherein said first means includes means coupled to said coil and responsive to a current level in said coil which corresponds to a scan to said edge of said viewing screen for producing said signal.

3. The combination as set forth in claim 1 wherein said deflection means includes a resettable ramp generator producing a deflection voltage and wherein said second means initiates retrace by resetting said ramp generator.

4. The combination as set forth in claim 2 wherein said deflection means also includes a resettable ramp generator coupled to said deflection coil for supplying a charging current thereto at a known rate for initiating said scan of said electron beam and wherein said second means initiates retrace by resetting said ramp generator.

5. The combination as set forth in claim 1 wherein succeeding scans normally occur from an origin radially outward a fixed distance which is, for some scans, beyond the viewing screen edge and which is, for other scans, not to said edge of said viewing screen and further including third means responsive to said indication that said scan has reached said fixed distance for also initiating said retrace.

6. The combination as set forth in claim 5 wherein said third means comprises a counter which counts as said scan progresses and means responsive to said circuit having reached a fixed count for producing a pulse to initiate said retrace.

7. A weather radar system which includes a cathode ray tube having a viewing screen, a deflectable beam and deflection means for deflecting said beam radially outward from an origin on said screen normally a fixed radial distance successively at a plurality of angles, said fixed radial distance extending beyond at least an edge of the viewing screen for some of the plurality of scan lines, the improvement comprising:
   means responsive to said beam being scanned to said edge for producing a first signal;
   means responsive to said beam scanned to said fixed radial distance for producing a second signal;
   means responsive to the first occurring of either said first or second signal for initiating retrace of said deflection beam to said origin and a fixed time after initiating said retrace for initiating the deflection by said deflection means at the next angle of said plurality of said angles.

8. The combination as set forth in claim 7 wherein said cathode ray tube includes orthogonal deflection coils and further including means producing orthogonal deflection signals coupled respectively to said coils for causing said radial scans to be uniformly spaced as a scan to said fixed radial distance occurs and to otherwise be at a smaller angular spacing depending on the length of the scan line before retrace and further including means responsive to at least one deflection voltage for altering the deflection signal to said respective coil to substantially maintain said uniform angular spacing for scan lines which do not extend to said fixed distance.

9. The combination as set forth in claim 8 wherein said altering means comprises a ladder network including a plurality of diodes each biased to conduction at a different deflection voltage.

* * * * *